United States Patent Office 3,230,278
Patented Jan. 18, 1966

3,230,278
METHOD OF MANUFACTURE OF URANIUM DI-
OXIDE HAVING A HIGH DENSITY
Walter Bauschmann, Wermelskirchen, Germany, and
Roger Pascard, Issy-les-Moulineaux, France, assignors
to Commissariat a l'Energie Atomique, Paris, France
No Drawing. Filed Dec. 21, 1961, Ser. No. 161,277
Claims priority, application France, Dec. 30, 1960,
848,484
1 Claim. (Cl. 264—.5)

The problem of sintering uranium dioxide at a density which is sufficient to permit of its use in a reactor has given rise to very considerable research.

High density of uranium dioxide fuels is necessary for the following reasons:

(1) In order to reduce the fission gases released.

In fact the increase in theoretic density from 93.7 to 97.4% reduces the production of the fission gases in the ratio of 10 to 1.

(2) In order to increase the heat conductivity.

In fact the following relation exists between the heat conductivity and the porosity.

$$k_z = \frac{k_p}{(1-p_v)}$$

$k_z$ = heat conductivity in respect of zero porosity
$k_p$ = heat conductivity in respect of a given porosity which is not zero
$p_v$ = fraction of volume occupied by the pores in respect of the given porosity.

Since the gases which fill the cavities behave as thermal insulators, it is advisable to reduce to the maximum the porosity of the fuel.

(3) In order to increase the nuclear reactivity.

(4) In order to reduce the frequency of replacements of the charge of fuel elements in reactors.

It is known that uranium dioxide produced from ammonium diuranate sinters much more satisfactorily than uranium dioxide which is obtained as a result of precipitation of uranyl nitrate.

It is also known that the calcinations for example of ammonium diuranate or uranyl nitrate which are carried out at lower temperatures produce particles having smaller sizes and a more uniform distribution of these sizes. The powders formed by small particles usually have a greater affinity for sintering treatment.

It is further known that the best sinters are obtained with non-stoichiometric powders prepared by the method of controlled oxidation of $UO_2$ or constituted by a mixture of $UO_2$ and $U_3O_8$. The controlled oxidation is necessarily limited, otherwise an exothermic reaction takes place, local overheating can occur and an excessive oxidation of $UO_2$ is liable to result. Furthermore, the mixture of $UO_2$—$U_3O_8$ is more difficult to compress, and in order to prevent foliation, the density when in the crude state of pellets, rings, plates, etc., must be kept lower, thereby resulting in greater shrinkage during the sintering process and in lower density after the sintering process.

It is also known that sintering by steam increases the density in a substantial manner, but that the sintering atmosphere affects the oxygen/uranium ratio of the final product.

Moreover, for the same density, sintered non-stoichiometric uranium dioxide shows a more substantial increase of grains and releases more fission gas than sintered stoichiometric uranium dioxide irradiated under the same conditions.

These different methods have the big disadvantage of entailing the need for sintering at temperatures of the order of 1400 to 1700° C.; in fact, the higher the sintering temperature rises and the higher the cost price of the nuclear fuel also rises. It has in fact been found that each reduction of 100° C. in the sintering temperature reduces by 50% the maintenance cost of the furnaces in which this operation takes place. Since this item has a direct and not negligible influence on the cost price of the fuel, it is consequently obvious that an economic method of manufacture of this latter is only satisfactory at sintering temperatures which are as low as possible.

A sintering process has already been proposed which, starting from powders of $UO_2$ having a large specific surface area, produces a sintered stoichiometric uranium oxide having a high density, at lower temperatures of the order of 1250 to 1400° C. However, apart from the fact that such a process makes it necessary to employ uranium dioxide having a specific surface area comprised between 8 and 15 square metres per gram and therefore to determine a choice of quality of the starting ammonium diuranate and requires a special delicate treatment with a view to retaining or obtaining the said specific surface area, such a process entails the need, if it is further desired that the shrinkage should not be too substantial, for the shaping of the uranium dioxide pellets in two stages of compression between which are interposed a crushing operation and a screening operation, all these operations having the result of increasing the cost price.

The present invention makes it possible to remedy the various drawbacks referred to above. It provides a means of obtaining in particular a fuel of sintered $UO_2$ having a high density, starting from a $UO_2$ powder of poor sinterability (that is to say having a specific surface area which is less than 3 square metres per gram and which can be even less than 1 square metre per gram) with small shrinkage during the sintering process; the invention further makes it possible, when employing powders of this kind, to produce sintered elements which offer these qualities in the case of low sintering temperatures which can be of the order of 1200 to 1300° C.

This method is characterized in that a uranium dioxide powder having a specific surface area which is less than 3 square metres per gram is mixed with a binding agent, a lubricant, a maximum of 2% by weight of an additive constituted by at least one of the two compounds NaF and $Nb_2O_5$, in that the paste thus formed is compressed under a pressure of the order of 2.5 tons to 10 tons per square centimetre, in that the binding agent and the lubricant contained in the compressed elements thus formed are eliminated by heating, and that the sintering treatment is then carried out by heating the said compressed elements at a temperature comprised between 1200° C. and 1700° C. for a period of time of the order of 1 to 6 hours, the rate of increase in the sintering temperature being less than 500° C. per hour.

The starting product employed can be either stoichiometric uranium dioxide or non-stoichiometric uranium dioxide on condition that there is carried out in this latter case a reduction in a hydrogen atmosphere at a temperature comprised between 600 and 800° C., and preferably in the vicinity of 700° C.; this reduction is not essential, however, in the case of nearly stoichiometric $UO_2$.

The starting product can also be a superior uranium oxide and can be derived from any source of supply, whether it is obtained, for example, as a result of calcination of ammonium diuranate or uranium peroxide or uranyl nitrate, or a a result of hydrolysis of uranium hexa-fluoride, or whether it is derived from wastes of uranium dioxide employed in other manufacturing processes, the said superior oxide must then be subjected to the reduction treatment in a hydrogen atmosphere as referred to above, at a temperature comprised between 600 and 800° C., preferably of the order of 700° C.

Irrespective of the nature of the starting product (stoichometric oxide, non-stoichiometric oxide, superior oxide) it is preferable in accordance with the invention, and after reduction if so required, to proceed to a heat treatment in a hydrogen atmosphere at a temperature comprised between 1100 and 1400° C., preferably of the order of 1300° C.; the effect of this heat treatment being to produce an annealing which gives the uranium dioxide a smaller specific surface area and maximum stability which is identical, moreover, in the case of all batches of $UO_2$; this annealing effect thus makes it possible to proceed to the compression and sintering of the powder after the said heat treatment, but if necessary only when a certain length of time has elapsed which can be of long duration.

If this annealing heating is not effected, it will nevertheless remain possible to carry out the compression and sintering operations under the same conditions, but the specific surface area will not be reduced, the density in the crude state will be slightly lower and the shrinkage during sintering will be slightly greater; furthermore, in order to prevent any evolution of the uranium dioxide powder which would be liable to considerably reduce its fitness for the sintering process, it will be necessary to carry out the said sintering process a short time after the annealing heating; experience has shown that if the operation were carried out under these conditions, by sintering eight days after the annealing heating, the results of the sintering were poor.

In accordance with the present invention, the compression is very usefully carried out in a single stage.

The binding agent employed is preferably camphor, in proportions by weight varying between 1 and 4% and the lubricant employed, which is preferably stearic acid in proportions by weight varying between 0.2 and 0.8%.

Sodium fluoride (NaF) is employed as an additive only, in a proportion by weight with respect to the powder which is comprised between 0.05 and 1% whilst the corresponding proportion of $Nb_2O_5$ employed alone is comprised between 0.1 and 1% and preferably between 0.3 and 0.5%.

The mixture of the powder with the binding agent, the lubricant and NaF and/or $Nb_2O_5$ is effected mechanically, for example in a ball-mill.

The homogeneous paste which results from this mixture is compressed under pressures varying between 2,500 and 10,000 kilograms per square centimetre. The sintering operation is carried out in a molybdenum-resistance furnace with automatic heating and cooling cycles. The objects which have been shaped are sintered in supports of molybdenum. The rate of heating for the purpose of complete elimination of the binding agent and lubricant is as follows, in the case of the binding agent and lubricant referred to above: heating from ambient or room temperature up to a temperature comprised between 325 and 375° C. during a period of time of the order of 1 to 3 hours.

The increase in temperature up to the sintering temperature is effected at a rate which is less than 500° C. per hour and preferably comprised between 150 and 250° C. per hour. Any increase in the sintering time above 6 hours is not economical and in most cases a period of the order of 4 hours is amply sufficient; thus a sintering time of 16 hours has shown no significant increase in the density.

There now follows below a description of various examples, given without any implied limitation, of practical application of the method of manufacture of sintered uranium dioxide having a high density which forms the subject of the present invention. The practical arrangements which will be described in connection with these examples must be considered as forming part of the present invention, it being understood that any equivalent arrangements could equally well be employed without thereby departing from the scope of the said invention.

*Example 1.*—0.4% by weight of $Nb_2O_5$, 3% by weight of camphor employed as a binding agent, and 0.5% by weight of stearic acid employed as a lubricant are added to a powder of almost stoichiometric uranium dioxide having a specific surface area of approximately 0.9 square metre per gram prepared by reduction in a hydrogen atmosphere at 700° C. followed by heat treatment at 1300° C., again in a hydrogen atmosphere, of $UO_3$ which is derived from the calcination of roasting of ammonium diuranate. The pellets are compressed under a pressure of 4,750 kilograms per square centimetre, which makes it possible to obtain a density in the crude state of 7.6. The thermal cycle is subsequently as follows: rate of increase in temperature of 200° C. per hour, followed by a level-temperature stage of 350° C. for a period of two hours. The sintering operation takes place in a hydrogen atmosphere with a cycle as follows: rate of increase in temperature of 200° C. per hour, followed by a level-temperature stage of 1200° C. for a period of 4 hours. There are thus obtained pellets of stoichiometric uranium dioxide having a density of 10.54, namely 96.7% of the theoretic density, with shrinkage of 11.3% in respect of the diameter and 9.5% in respect of the length.

*Example 2.*—0.4% by weight of $Nb_2O_5$ and 0.1% by weight of NaF are added to a powder of almost stoichiometric uranium dioxide having a specific surface area of approximately 0.8 square metre per gram and prepared under the same conditions as in Example 1 by reduction of $UO_3$ which is derived from the calcination of uranyl nitrate. The weights of the camphor and stearic acid and the conditions of pressure, which are identical to those of Example 1, make it possible to obtain a density in the crude state of 7.6. The heating cycle is the same as in Example 1. Pellets are produced which have a density of 10.67, namely 98.3% of the theoretic density, with shrinkages of 11.9% in respect of the diameter and 10.6% in respect of the length.

*Example 3.*—0.3% by weight of $Nb_2O_5$ and 0.2% by weight of NaF are added to a powder of almost stoichiometric uranium dioxide having a specific surface area of approximately 0.8 square metre per gram and prepared under the same conditions as in Example 1 by reduction of $UO_3$ which is derived from the calcination of uranyl nitrate. The weights of the camphor and stearic acid and the conditions of pressure, which are identical to those of Example 1, make it possible to obtain a density in the crude state of 7.6. The heating cycle is the same as in Example 1. Pellets are produced which have a density of 10.64, namely 98.2% of the theoretic density, with shrinkages of 11.9% in respect of the diameter and 10.0% in respect of the length.

*Example 4.*—0.4% by weight of $Nb_2O_5$ and 0.4% by weight of NaF are added to a powder of stoichiometric uranium dioxide having a specific surface area of approximately 0.9 square metre per gram. The weights of the camphor and stearic acid and conditions of pressure, which are identical to those of Example 1, make it possible to obtain a density in the crude state of 7.5. The heating cycle is the same as in Example 1. Pellets are produced which have a density of 10.53, namely 97.7% of the theoretic density, with shrinkages of 11.7% in respect of the diameter and 9.4% in respect of the length.

*Example 5.*—0.4% by weight of $Nb_2O_5$ is added to a uranium dioxide powder which has a specific surface area of approximately 2.5 square metres per gram and which is obtained as a result of treatment of the uranium dioxide in a hydrogen atmosphere at a mean temperature of 1100° C.; the quantities of binding agent and lubricant and the conditions of pressure are identical to those of Example 1; the heating cycle is also the same and the sintering temperature is 1200° C.; sintered pellets are obtained having a density which is equal to 96.5% of the theoretic density.

*Example 6.*—0.3% by weight of $Nb_2O_5$ and 0.7% by weight of NaF are added to a powder of almost stoichiometric uranium dioxide having a specific surface area of approximately 1 square metre per gram and prepared under the same conditions as in Example 1 by reduction of uranium oxides derived from waste products of other manufacturing processes. The weights of camphor and stearic acid and conditions of pressure, which are identical to those of Example 1, make it possible to obtain a density in the crude state of 7.5. The heating cycle is the same as in Example 1. Pellets are obtained which have a density of 10.45, namely 97.8% of the theoretic density, with shrinkages of 11.6% in respect of the diameter and 9% in respect of the length.

*Example 7.*—0.8% of $Nb_2O_5$ is added to a uranium dioxide powder having a specific surface area of approximately 0.8 to 1 square metre per gram; other conditions are moreover, identical to those of Example 1; the density of the sintered pellets which are finally obtained is equal to 94.8% of the theoretic density.

*Example 8.*—0.3% by weight of $Nb_2O_5$ and 1% by weight of NaF are added to a uranium dioxide powder having a specific surface area of approximately 1 square metre per gram and prepared under the same conditions as in Example 1 by reduction of uranium oxides derived from the waste products of other manufacturing processes. The weights of camphor and stearic acid and conditions of pressure, which are identical to those of Example 1, make it possible to obtain a density in the crude state of 7.5. The heating cycle is the same as in Example 1. Pellets are obtained which have a density of 10.25, namely 96.7% of the theoretic density, with shrinkages of 11.7% in respect of the diameter and 9.2% in respect of the length.

*Example 9.*—0.4% by weight of $Nb_2O_5$ is added to a powder of almost stoichiometric uranium dioxide having a specific surface area of approximately 0.8 square metre per gram and prepared under the same conditions as in Example 1 by reduction of $UO_3$ which is derived from the calcination of uranyl nitrate. The weights of camphor and stearic acid are identical to those of Example 1. A compression under a pressure of 5,000 kilograms per square centimetre makes it possible to obtain a density in the crude state of 6.8. The heating cycle is the same as in Example 1. Pellets are obtained which have a density of 10.48, namely 96.1% of the theoretic density, with shrinkages of 15.4% in respect of the diameter and 13.4% in respect of the length.

*Example 10.*—0.4% of $Nb_2O_5$ employed as an additive is added to a uranium dioxide powder having a specific surface area of approximately 0.8 square metre per gram; the conditions governing the binding agent, the lubricant, the compression, the elimination of the binding agent, the rate of increase in the sintering temperature and the sintering time are identical to those of Example 1; the sintering temperature is 1600° C.: the density achieved is equal to 98.4% of the theoretic density.

*Example 11.*—0.3% by weight of $Nb_2O_5$ and 0.1% by weight of NaF are added to a powder of almost stoichiometric uranium dioxide having a specific surface area of approximately 0.8 square metre per gram and prepared under the same conditions as in Example 1 by reduction of $UO_3$ which is derived from the calcination of uranyl nitrate. The weights of the camphor and stearic acid are identical to those of Example 1. A compression under a pressure of 5,000 kilograms per square centimetre makes it possible to obtain a density in the crude state of 6.8. The heating cycle is the same as in Example 1. Pellets are obtained which have a density of 10.45, namely 96.1% of the theoretic density, with shrinkages of 15.1% in respect of the diameter and 13.1% in respect of the length.

*Example 12.*—0.4% by weight of $Nb_2O_5$ and 0.05% by weight of NaF are added to a powder of almost stoichiometric uranium dioxide having a specific surface area of approximately 1 square metre per gram and prepared under the same conditions as in Example 1 by reduction of uranium oxides derived from waste products of other manufacturing processes. The weights of camphor and stearic acid are identical to those of Example 1. Compression under a pressure of 5,000 kilograms per square centimetre makes it possible to obtain a density in the crude state of 6.8. The heating cycle is the same as in Example 1. Pellets are obtained which have a density of 10.5, namely 96.4% of the theoretic density, with shrinkages of 14.8% in respect of the diameter and 13.4% in respect of the length.

What we claim is:

A process for producing sintered uranium dioxide having a high density comprising mixing uranium dioxide powder having a specific surface area of less than 3 square metres per gram with a binding agent, a lubricant, and about 0.05 to 1% by weight of NaF; compressing the resulting mixture under a pressure of 2,500 to 10,000 kilograms per square centimetre to form compressed elements; heating said compressed elements to eliminate said binding agent and said lubricant and then further heating said compressed elements at a temperature between about 1200° C. and 1300° C. for a period of about 1 to 6 hours to sinter them, the rate of increase in the temperature during said sintering step being less than 500° C. per hours.

References Cited by the Examiner

Bel et al., "2nd U.N. Conference on Peaceful Uses of Atomic Energy, vol. 6, pages 612–619 (1958).

Chalder et al., "2nd U.N. Conference on Peaceful Uses of Atomic Energy," vol. 6, pages 590–604 (1958).

Nuclear Science Abstracts, vol. 14, Abstract 7767, April 30, 1960.

TID–7546, Book 2, pages 417–422, 433–439, 444–447, 475 (November 1957).

LEON D. ROSDOL, *Primary Examiner.*

CARL D. QUARFORTH, REUBEN EPSTEIN,
*Examiners.*

A. G. BOWEN, *Assistant Examiner.*